United States Patent [19]

Kunkel

[11] Patent Number: 4,710,620
[45] Date of Patent: Dec. 1, 1987

[54] SENSING APPARATUS FOR DETERMINING THE RELATIVE POSITION BETWEEN TWO BODIES WITH PLURAL EMITTERS AND A SHADING MEMBER

[75] Inventor: Bernd Kunkel, Kirchheim, Fed. Rep. of Germany

[73] Assignee: Messerschmitt-Bölkow-Blohm GmbH, Fed. Rep. of Germany

[21] Appl. No.: 768,409

[22] Filed: Aug. 22, 1985

[30] Foreign Application Priority Data

Aug. 28, 1984 [DE] Fed. Rep. of Germany ....... 3431616

[51] Int. Cl.$^4$ ................................................ G01J 1/20
[52] U.S. Cl. .................................. 250/203 R; 356/152
[58] Field of Search ........................... 356/1, 141, 152; 250/560, 561, 203, 204; 244/3.16

[56] References Cited

U.S. PATENT DOCUMENTS 3,224,709  12/1965  Blizard ................................ 356/152
3,790,276   2/1974  Cook et al. ..................... 250/203 R Primary Examiner—David C. Nelms
Attorney, Agent, or Firm—Toren, McGeady & Associates

[57] ABSTRACT

Sensing apparatus for determining the relative position between two bodies located at a distance from one another with respect to a predetermined relative position wherein one of the bodies is provided with a camera having an areal matrix of photosensitive elements arranged in the image plane of the camera and wherein the other of the bodies is provided with a shading member projecting from the surface thereof and with an optically clearly distinguishable reference pattern in the area of the base of the shading member, the reference pattern being formed by means of light sources which emit light patterns which are as punctiform as possible. The reference pattern is partially covered in an asymmetric manner by the shading member during deviation from the reference position and this deviation is sensed by the photosensitive elements in the camera.

6 Claims, 2 Drawing Figures

SENSING APPARATUS FOR DETERMINING THE RELATIVE POSITION BETWEEN TWO BODIES WITH PLURAL EMITTERS AND A SHADING MEMBER

The present invention is directed to measuring apparatus for determining the relative position between two bodies located at a distance from one another with respect to a pregiven reference position. More particularly, the invention is directed to apparatus comprising at one body means for sensing an optically or visually clear distinguishable reference pattern on the other body in order to determine deviation from the relative reference position between the bodies.

Measuring apparatuses used for determining the relative position of two bodies with respect to a pregiven reference position are required in various branches of technology. For example, robots must be capable of bringing parts to be mounted at a body or to be fitted into openings at a body to this body in very specific predetermined orientation. Also, in submarine technology, such devices may be utilized, for example, in automatic or remote-controlled maneuvering of crewless minisubmarines.

In space travel, the problem can be posed with regard to effecting the approach of manned or crewless space missiles or satellites to one another and for effecting coupling thereof by means of coupling devices provided for this purpose. In this situation, caution must be exercised before coupling in order to insure that the actively approaching space missile exactly observes and maintains the required reference position with respect to the passive space missile. For this purpose, again, deviations from the reference position must be quickly and accurately sensed and measured, especially for automatic operation, so that the required position corrections or adjustments can be effected in due time.

Such apparatus is known in the prior art from U.S. Pat. No. 3,910,533, by means of which the docking of a space vehicle at another space vehicle is made possible. For this purpose, a television camera is attached in the center of the docking apparatus for the active space vehicle, which television camera scans the docking apparatus of the passive space missile in its viewing field during the approach of the active space missile to the passive space missile. The approach process of the two space missiles is ideal when the two axes of symmetry of the docking apparatuses coincide continuously.

However, in most cases, this is not insured from the outset of the docking maneuver. In order to be able to determine deviations from this reference position, there is provided in the center of the docking apparatus of the passive space missile a shading member which projects forwardly from the surface of the latter and exactly and completely covers a reference pattern located in the area of its base, as seen from the camera of the active space missile, when the two space missiles are located in the relative reference position. This reference position corresponds to the mutual orientation of the space missiles required for docking in which the two axes of symmetry coincide with or are coaxial with one another in position and direction and a predetermined relative angular position is also established with respect to these axes of symmetry.

The shading member is a square frame attached on supports at whose base is located a similarly square-shaped band as a reference pattern with clearly visible transverse striping. As seen from a determined point on the axis of symmetry of the docking apparatus of the passive space missile, this square band is optically completely covered or shaded by means of the frame arranged in front of it. If, on the other hand, the active space missile with its camera approaches from a lateral position, the square band serving as the reference pattern is then only partially covered. The image which is outlined or projected by the camera arrives on a monitor and can there be observed by the pilot of the active space missile. The pilot is then able to carry out correcting or adjusting control movements in order to bring the active space missile into the reference position. The direction in which these control movements are to be carried out results from the perspective mutual displacement of the frame and reference pattern visible on the monitor. The result of the control command can be followed or tracked on the monitor at any time.

The apparatus described in U.S. Pat. No. 3,910,533 is designed such that correcting movements in the direction of the desired reference position are carried out by a pilot controlling the active space missile. An approach which is automatically carried out is not possible with this apparatus. Moreover, the apparatus gives a visual impression of the magnitude and direction of the deviation of the active space missile from the reference position. However, this is not a measuring apparatus in the true sense. An exact deviation measurement is not intended and is also not required because of the presence of a pilot or astronaut. This apparatus is, therefore, unsuitable for use in unmanned or crewless space vehicles and it requires great experience and absolute concentration on the part of the pilot.

In contrast, the present invention is directed toward providing a measuring apparatus of the aforementioned type, which makes it possible to automatically measure as accurately as possible the relative position between two bodies, particularly space missiles, located at a distance from one another, with regard to a relative reference position so that the required position corrections can be carried out reliably and automatically on the basis of the results obtained. This capability has particular importance with regard to the measurement of tilting or pitching of the two axes of symmetry relative to one one another, since it was not previously possible to measure such tilting with the required accuracy, while maintaining justifiable cost limits for the apparatus.

SUMMARY OF THE INVENTION

Briefly, the present invention may be described as sensing apparatus for determining the relative position between two bodies which are located at a distance from each other with respect to a predetermined relative reference position between the bodies, comprising camera means provided at one of the bodies, a shading member provided at the other of the bodies projecting from the surface of said other body, and means for defining an optically clearly distinguishable reference pattern in the area of the base of the shading member, said reference pattern being formed preferably by means of light sources, such as light emitting diodes which emit a light pattern which is as punctiform as possible with the light sources being linearly or areally distributed outside the base of the shading member. The reference pattern which is defined is partially covered in an asymmetric manner by the shading member during deviation of the two bodies from the reference position.

The camera is provided with an areal matrix of photosensitive elements arranged in the image plane of the camera adapted to sense the light sources defining the reference pattern.

The proposed operating characteristics of the invention are achieved in that an areal matrix of photosensitive elements is arranged in the image or focal plane of the camera and the reference pattern is formed by means of light sources which emit light in a pattern as punctiform as possible and are distributed in a lineal or areal arrangement outside the base of the shading member. Instead of a television camera connected with a monitor, a CCD or CID camera, for example, is used, in whose image plane a CCD or CID array is located, respectively. Such cameras, in contrast to television cameras, comprise a coordinate allocation of the image plane which can be fixed or determined in an unequivocal manner. In addition, the reference pattern, according to the invention, is formed by means of a lineal or areal arrangement of light sources which are as punctiform as possible, preferably light emitting diodes or LEDs, which are arranged outside the base of the shading member. During lateral displacement or tilting of the axis of symmetry of one body relative to the axis of symmetry of the other body, a part of the light sources is accordingly covered by means of the shading member in the image of the reference pattern outlined in the image plane of the camera. According to the shape of the shading member, which preferably can be circular-cylindrical or cubic, as well as to the specific arrangement of the light sources, a shading pattern results which is characteristic for the type of deviation from the reference position, from which shading pattern the deviation magnitudes, such as tilting angle or relative displacement of the axes of symmetry, can be determined on the basis of purely geometric relationships, possibly by means of comparison with a stored image corresponding to the exact reference position.

The closer the light sources are arranged adjacent one another, the more punctiform they are and the smaller and closer together the photosensitive elements of the camera matrix are, the more accurate the measuring apparatus.

A particularly simple measuring apparatus is provided by using light diode rows of equal lengths arranged in a cruciform pattern. In this case, the shading member is advisably constructed as a circular cylinder. During tilting of the axes of symmetry relative to one another, one or two of the four half-rows are partially covered starting from the base, with more of their length being covered as the tilting angle increases. The extent and the direction of the relative tilting can also be unquivocally concluded from the covering degree of these partially shaded light diode rows. Also, pure rotation around the axes of symmetry can be determined with the aid of such cruciform light diode row.

In addition to a cruciform arrangement of light diode rows, other radiating or radially extending arrangements of light diode rows are also possible. Light sources which are arranged close together and distributed over a surface area, i.e., areally, can also serve as a reference pattern, for example, light diodes which are preferably uniformly distributed within a circular or rectangular surface area. Here, as well, the deviation magnitudes can be concluded from the direction and extent of the shading. In practice, light diode rows have the advantage that, to the extent that they are so arranged, during deviation, particularly during tilting, a corresponding shading occurs which can be evaluated in an unequivocal manner since the linear arrangement is naturally distinguished, in comparison to the areal arrangement, by substantially lower expenditure in signal processing.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENT

Figure 1:
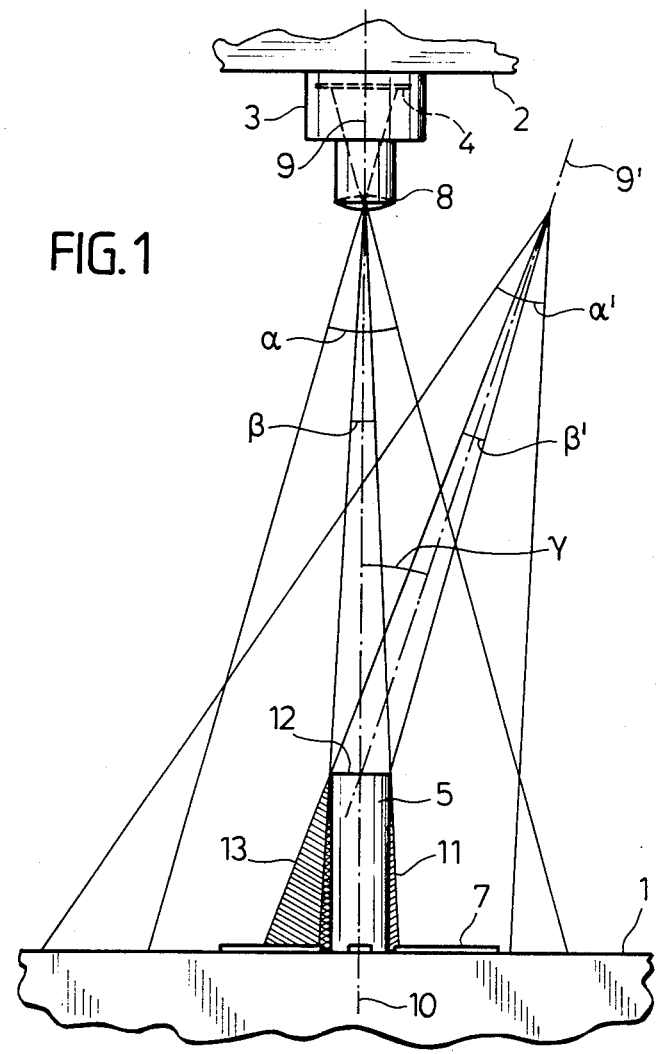
FIG. 1 is an elevation or side view showing schematically the apparatus of the invention, including a cylindrical shading member with a light diode cross in the optical path of a camera lens, in two different positions.

Referring now to the drawings, and particularly to FIG. 1, there is shown schematically, in side view, apparatus according to the invention comprising a cylindrical shading member 5 which is attached on the surface of a body 1, for example, a passive satellite. Attached in a symmetrical arrangement around the base of the cylindrical shading member 5 are four rows 7 of light emitting diodes 6 (LEDs) at an angular distance of 90° relative to one another, which together accordingly form a light diode cross (see also FIG. 2). Shown above the shading member 5 is a body 2, e.g., an active second satellite, located in an approach to the body 1. The body 2 approaching the passive satellite 1 is equipped with a camera 3 arranged to have the shading member 5 and its surroundings on the surface of the body 1 in its viewing field.

Located in the image plane of a lens 8 of the camera 3 is an areal matrix 4 of readable, photosensitive elements. The latter can be CCD or CID sensors, wherein CCD refers to a charge coupled device and CID refers to a charge injection device. The camera 3 is thus a solid-state type camera whose sensor elements can be electronically directly read out, i.e., without the auxiliary means of an electron beam to be guided in a vacuum. The lens 8 of the camera 3 preferably has a variable focal length which is automatically tracked during the approach to the subject of observation, in this case, the surface of the body 1 with the shading member 5, for example, on the basis of simultaneous distance measurements.

FIG. 1 shows a position of the two bodies 1 and 2 relative to one another in which the axis of symmetry 9 of the lens 8 of the camera 3 coincides with the axis of symmetry 10 of the shading member 5. Accordingly, a completely symmetrical image of the shading member 5, as well as of the light diode rows 7, appears in the image plane of the lens 8. FIG. 1 shows the angle of view or angular field $\alpha$ of the lens 8 at the distance of the two bodies 1 and 2 from one another, shown in the drawing, as well as the angle of vision $\beta$ at which the cylindrical shading member 5 appears, as seen from the camera 3. Accordingly, a circular shading zone 11 results, i.e., an area around the base of the shading member 5 which, as seen from the camera 3, is covered by means of the latter. However, this does not impair the symmetry with respect to the quantity of light diodes 6 still visible in the four light diode rows 7, as seen from the camera. The circular area 11 increases as the approach of the camera 3 increases, but an equal quantity of light diodes 6 in each light diode row 7 is covered by means of this. In this case, the approaching body 2 is already in the ideal position provided for possible coupling. The distance as well as the approach speed of the body 2 with respect to the body 1 can be deduced from the increasing covering degree of the light diode rows 7 given by the increasing shading zone 11. In addition, the length of the still unshaded light diode rows 7 increasing in the image plane of the lens 8 can likewise be used, possibly accompanied by a selection of two fixed reference diodes whose increasing image distance is measured In addition, FIG. 1 shows a second position of the body 2 indicated by means of an inclined axis of symmetry 9', in which second position the axis of symmetry 9' is tilted relative to the axis of symmetry 10 of the shading member 5 at an angle $\gamma$. The covering surface 12 of the shading member 5 now appears at a somewhat reduced angle of vision $\beta'$ and, above all, there results a shading zone 13 which is asymmetrical relative to the axis of symmetry 10, so that, as seen from this new camera position, a considerable part of the light diode row 7' shown at the left in FIG. 2 appears covered by means of the shading member 5. The tilting angle $\gamma$ is unequivocally deduced from the quantity of covered light diodes 6 to the extent that the distance of the camera 3 from the shading member is simultaneously known. This, in turn, can be determined from the image length of the uncovered light diode rows 7, in particular of the two which are oriented perpendicularly relative to the rows 7'. The tilting angle $\gamma$ is then determined on the basis of generally known trigonometric relations.

Figure 2:
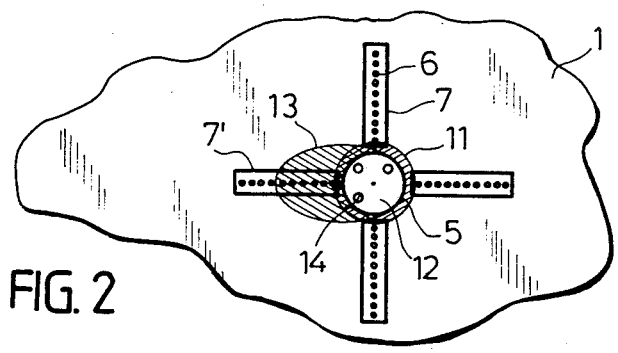
FIG. 2 is a top view showing the cylindrical shading member with the light diode cross.

In the second camera position (axis of symmetry 9') shown in FIG. 1, lateral offsettings are already corrected so that during the further position correction, only the tilting angle $\gamma$ must be brought to zero. FIG. 2 shows three additional light diodes 14 on the covering surface 12 of the shading member 5, which additional light diodes 14 can be used as a reference pattern in approaching from greater distances and must therefore have a correspondingly greater light-transmitting capacity. However, these light diodes 14 can also be used as desired in the closer distance range in order to determine lateral offsetting or rotation, i.e., bearing or roll angle deviations of the approaching body 2 with respect to the ideal reference position. However, in principle, at least rotation alone can also be determined by means of the light diode rows 7 arranged in a cruciform manner, wherein one of the rows, in particular, is to be characterized, possibly by means of omitting individual light diodes 6, through color or pulse frequency coding. In order to make these light diodes used as light sources particularly visible relative to the immediate surrounding, the cylindrical shading member 5, as well as the surface of the body 1 surrounding its base and the light diode rows 7, are advisably blackened or darkened so that no disturbing light reflections can occur.

In the selected arrangement of the reference pattern as a light diode cross, the roll angle deviation, i.e., the rotation of the approaching body 2 around the axis of symmetry of the camera 3 with respect to a pregiven zero position, the lateral offsetting, as well as the tilting angle, can be determined by means of comparison with a stored reference image of this reference pattern. In addition, the relative distance can be determined, for example, with the aid of a stored distance scale with stored images of the reference pattern which differ in dimensioning in dependence on the distance, as well as the relative speed, namely by means of the determined changes in distance.

The CCD or CID matrices can be read out in a known manner and the readout information can be digitized and evaluated in this form in a conventional manner and fed to the required calculating operations. With a suitable selection of parameters, such as dimensioning and shape of the shading member, length and arrangement of the light diode rows, as well as mutual distance of the individual light diodes, camera focal length and quantity, as well as closeness of the CCD or CID sensor elements arranged in a matrix in the image plane of the camera, angle resolutions or definitions of an order of magnitude of 0.05°, as well as resolutions with respect to the lateral offsetting of less than 1 mm, can be achieved with a measuring arrangement, according to the invention, at a distance of the camera from the shading member amounting to a few meters. These resolution values can be further improved when using suitable interpolation methods.

It can be advantageous to use the light diodes in pulse operations in order to make them unequivocally recognizable relative to a light background. In order to be able to determine rotations with respect to the axis of symmetry in an unequivocal manner, it is advisable to divide at least one of the light diode rows in segments, in the case of a light cross, such that the segments can be switched off separately as desired. The unambiguity in determining the relative position can also be insured by operating one or more of the light diode rows accompanied by a predetermination of different frequency codes.

Accordingly, it will be seen from the foregoing that the present invention provides measuring apparatus used for determining the relative position of two bodies located at a distance from one another, for example, two satellites approaching one another, with reference to a predetermined reference position. A camera 3 is provided at one body 2 and a shading member 5 is provided at the other body 1. Provided in the base area of this shading member 5 is an optically clearly distinguishable reference pattern 7 which is partially covered in an asymmetrical manner by the shading member during deviation from the reference position. In order to automatically measure as accurately as possible the relative position of the two bodies relative to one another, particularly with respect to tilting of the two axes of symmetry relative to one another, an areal matrix 4 of photosensitive elements is arranged in the image plane of the camera 3. Moreover, the reference pattern is formed by means of light sources, for example, light emitting diodes, which are as punctiform as possible and are distributed linearly or areally outside the base of the shading member 5.

While a specific embodiment of the invention has been shown and described in detail to illustrate the application of the inventive principles, it will be understood that the invention may be embodied otherwise without departing from such principles.

What is claimed is:

1. Sensing apparatus for determining the relative position of two bodies located at a distance from one another with respect to a predetermined reference position comprising: a camera having an areal matrix of photosensitive elements arranged in the image plane thereof mounted at one of said bodies; a shading member provided at the other of said bodies projecting from the surface thereof; and means defining an optically clearly distinguishable reference pattern in the area of the base of said shading member, said reference pattern being formed by means of a plurality of light sources each emitting a light pattern which is as punctiform as possible with said reference pattern being linearly or areally distributed outside of said base of said shading member; said reference pattern being partially covered in an asymmetric manner by said shading member during a deviation of said two bodies from said reference position.

2. Apparatus according to claim 1, wherein said reference pattern comprises rows of light sources of equal length arranged in a cruciform pattern.

3. Apparatus according to claim 1, wherein said light sources are distributed within a circular surface area defining said reference pattern.

4. Apparatus according to claim 1, wherein said light sources are light emitting diodes.

5. Apparatus according to claim 1, wherein said light sources are arranged in a plurality of rows with at least one of said rows being divisible in segments and with at least one of said segments being adapted to be switched off.

6. Apparatus according to claim 1, wherein said light sources are operable by pulsed operation thereof.

* * * * *